United States Patent

Rankl et al.

Patent Number: 5,534,683
Date of Patent: Jul. 9, 1996

[54] SYSTEM FOR CONDUCTING TRANSACTIONS WITH A MULTIFUNCTIONAL CARD HAVING AN ELECTRONIC PURSE

[75] Inventors: Wolfgang Rankl, München; Dieter Weiss, Hergatz, both of Germany

[73] Assignee: Giesecke & Devrient GmbH, Munich, Germany

[21] Appl. No.: 315,509

[22] Filed: Sep. 30, 1994

[30] Foreign Application Priority Data

Sep. 30, 1993 [DE] Germany ............... 43 33 388.5

[51] Int. Cl.⁶ .................................................. G06K 5/00
[52] U.S. Cl. ........................................... 235/380; 235/379
[58] Field of Search ........................................ 235/380, 379

[56] References Cited

U.S. PATENT DOCUMENTS

| | | | |
|---|---|---|---|
| 4,877,950 | 10/1989 | Halpern | 235/380 |
| 4,992,646 | 2/1991 | Collin | 235/380 |
| 5,030,806 | 7/1991 | Collin | 235/380 |
| 5,128,997 | 7/1992 | Pailles | 235/380 |
| 5,231,666 | 7/1993 | Matyas | 380/25 |

*Primary Examiner*—Harold Pitts
*Attorney, Agent, or Firm*—Watson Cole Stevens Davis

[57] ABSTRACT

In a system for conducting transactions with a multifunctional card having an integrated circuit, the circuit contains a bank application associated with the user's account-keeping bank and at least one purse application associated with a services supplier or manufacturer. With the aid of an apparatus communicating with the card, the card user can load a selectable sum of money into the purse application. The purse supplier is provided with a transaction certificate about the sum loaded in the purse and to be credited to the purse supplier's account, without a need for storing the secret data necessary for preparing this certificate in the purse application or in the purse terminal.

7 Claims, 3 Drawing Sheets

FIG. 2

Transfer

Terminal:
$DAT_{Term} = (RND, TID, TTA, TB)$
$S1_{Purse}(DAT_{Term}) \Rightarrow MAC_{Term}$ 1. $\boxed{DAT_{Term}, MAC_{Term} \dashrightarrow Purse}$ Purse:
$S1_{Purse}(DAT_{Term}) \Rightarrow MAC'_{Term}$
$MAC_{Term} = MAC'_{Term}$ 2. $\boxed{DAT_{Term} \dashrightarrow Bank}$ Bank:
$TB \leq VR$
$VR = VR - TB$
$GTZ > BTZ$
$GTZ = GTZ + 1$
$DAT_{BANK} = (DAT_{Term}, PAN, BLZ)$
$S_{Bank}(DAT_{Bank}) \Rightarrow MAC_{Bank}$
$ZF_{Bank} = (DAT_{Bank}, MAC_{Bank})$
$GTZ \dashrightarrow BTZ$ 3. $\boxed{ZF_{Bank} \dashrightarrow Purse}$ Purse:
$TB \dashrightarrow BSRAM$
$S1_{Purse}(ZF_{Bank}) \Rightarrow MAC1_{Purse}$
$S2_{Purse}(ZF_{Bank}) \Rightarrow MAC2_{Purse}$ 4. $\boxed{ZF_{Bank}, MAC1_{Purse} \dashrightarrow Terminal}$ Terminal:
$S1_{Purse}(ZF_{Bank}) \Rightarrow MAC1'_{Purse}$
$MAC1_{Purse} = MAC1'_{Purse}$

FIG.3

Confirm

Terminal: $S2_{Purse}(ZF_{Bank}) => MAC2'_{Purse}$

5.  | $MAC2'_{Purse} \rightarrow Purse$ |

Purse: $MAC2_{Purse} = MAC2'_{Purse}$
$BSRAM \rightarrow BSS$
Erase BSRAM

6.  | o.k. $\rightarrow$ Terminal |

SYSTEM FOR CONDUCTING TRANSACTIONS WITH A MULTIFUNCTIONAL CARD HAVING AN ELECTRONIC PURSE

FIELD OF THE INVENTION

The present invention relates to a system for conducting transactions with a multifunctional card.

Cards such as ec cards, credit cards or telephone cards with an integrated circuit that are available to the user for various transactions are commonly known. These ec cards or credit cards are increasingly also used for conducting cashless transactions from the user's own bank account to any other desired bank account. This is generally done with services suppliers or dealers having a corresponding terminal which the card user uses for conducting the transactions.

A further type of cashless payment is offered by the so-called electronic purse. To activate the purse the card user makes an advance payment to the purse supplier, obtaining in return a corresponding number of units of value that are stored in the electronic purse. Each time a service is used the purse is reduced by a corresponding sum.

Due to the increasing efficiency of the integrated circuits used in cards there are increasing efforts to propose so-called multifunctional cards that permit the user to utilize the stated types of transactions (bank application, purse application) with only one card.

Such a multifunctional card generally has a bank application associated with the user's account-keeping bank and at least one purse application associated with a services supplier or dealer.

BACKGROUND OF THE INVENTION

EP-A 058 029 discloses a multifunctional card with a purse function. The multifunctional card used here distinguishes several bank areas, a credit-card area and a purse area. The user is able to gain access to a bank or credit-card area with the aid of a personal identification number (PIN). The user can now reload a certain sum of money from this area to the purse area and then utilize this sum to avail himself of services or goods without entering his PIN.

EP-A 058 029 contains no information about how the load operation is protected from fraudulent manipulations.

The load operation of a purse is generally performed via an apparatus (terminal) which is within the sphere of responsibility of the purse supplier. The load process necessarily includes the bank application of the card which is within the sphere of responsibility of the bank. Communication is thus necessary between the components of the system within different spheres of responsibility, so that it is necessary in the interests of all institutions participating in the system to make the total process resistant to forgery and to ensure the integrity of the secret information required in the various components of the system.

SUMMARY OF THE INVENTION

The invention is therefore based on the problem of proposing a system that takes account of the abovementioned difficulties.

The problem of the invention is solved by the features stated in the characterizing part of the main claim.

The essence of the invention is to provide the purse supplier with an authentic certificate about the sum to be loaded in the purse and credited to the purse supplier's account without the secret data necessary for preparing this certificate having to be stored in the purse application or in the purse terminal.

For this purpose a certificate is prepared in a first step of the transfer process in the bank application about the sum selected by the customer and further transaction data with secret data stored only in the bank application, this certificate then being transmitted to the purse application within the integrated circuit. In the purse application an authenticating code is calculated for this transaction certificate with secret data that are stored solely in the purse application or in the terminal. The transaction certificate and authenticating code are transmitted to the terminal and verified therein. If comparison is positive the purse terminal can assume that the transmitted data are authentic.

In a second step the purse terminal confirms reception of genuine data by preparing a further authenticating code on the received data and sending it back to the purse application. In the purse application this second authenticating code is verified. If comparison is positive the purse application can assume that the terminal has received a genuine transaction certificate. Only after this comparison is the sum preselected by the user finally transmitted to the purse memory of the purse application. This ends the transfer.

The advantage of the invention is that it preserves the integrity of the secret data of the institutions participating in the system. If several purse applications are implemented in a multifunctional card no common codes are necessary for transferring sums from the bank application to a purse application. The individual purses are completely independent from one another and always work with their own codes. The method ensures that the purse terminal receives a transaction certificate and that this certificate is valid. Only after a suitable check is the sum selected by the user loaded in the purse. The method simultaneously ensures that both the terminal and the card are authentic.

It is preferably checked in the bank application before preparation of the transaction certificate whether the sum selected by the card user is smaller than the sum stored in a so-called disposal limit. The current value of the disposal limit constitutes the upper limit for the usable sum of money. When the disposal limit is used up no further transfers to a purse are possible. The disposal limit can only be loaded again by a transaction with the card user's account-keeping bank made possible by entering the PIN. These measures protect the card user, upon loss of the card, from excessive sums being transferred abusively to the purse as long as the purse function can be activated without a previous PIN check.

According to a development of the invention it is proposed that a global transaction counter be provided in the bank application for counting all transactions running via the bank application. A corresponding counter is provided for the purse application. After each transfer process from the bank application to the purse application the reading of the transaction counter in the bank application is transmitted to the reading of the transaction counter in the purse application. A transfer is only possible if the reading of the transaction counter is greater in the bank application than that in the purse application. This measure has the advantage that no more than one transfer can be performed with a stolen card since a second attempt is aborted due to the identity of the counter readings then existing. Only a transaction with the account-keeping bank, which requires a PIN to be entered, increases the transaction counter in the bank application thereby enabling a further transfer. A card with several purse applications is provided with a counter common to all purses.

BRIEF DESCRIPTION OF THE DRAWINGS

Further advantages and developments of the invention are the object of the subclaims and the following description of an embodiment of the invention to be described by way of example with reference to the drawing, in which:

FIG. 2 shows a flow chart of the transfer process, FIG. 3 shows a flow chart of the confirmation process.

DETAILED DESCRIPTION OF THE PREFERRED EMBODIMENT

Figure 1:
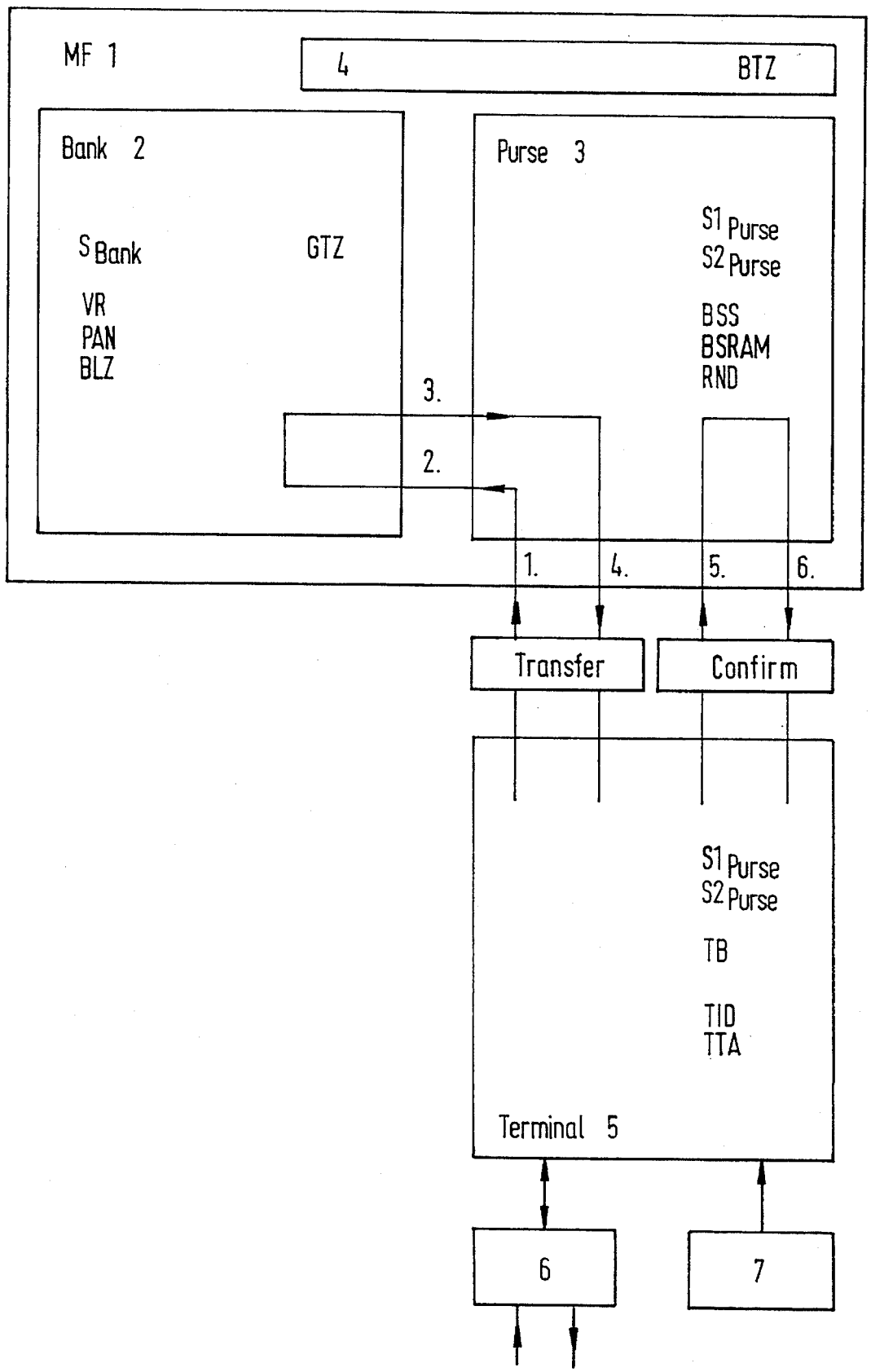
FIG. 1 shows a schematic representation of the information flow between the various components.

FIG. 1 shows an exemplary embodiment of the essential components of the inventive system. It comprises multifunctional card 1 (MF) and terminal 5 with interface 6 for communication with other units and keyboard 7. The multifunctional card is divided into three areas, bank area 2, purse area 3 and system area 4. The bank or purse area can be accessed only by the specially authorized suppliers. The system area contains, among other things, general data that can be utilized by several users. In the following only those data stored in the individual areas and processes or programs will be dealt with which are necessary for understanding the invention.

The code $S_{Bank}$ stored in bank application 2 serves together with a suitable algorithm for calculating the bank-specific certificate. The code is only known to the bank or only stored in the bank application. So-called disposal limit VR is also stored in the bank application to define the maximum sum available to the user. The disposal limit is thus equivalent to a limited sum which the user can dispose of without an authorization process with the account-keeping bank. A used-up disposal limit can only be initialized by a PIN-coupled process authorized by the account-keeping bank. Account number PAN also stored in the application and bank sort code BLZ serve to identify the user with respect to the bank. Transaction counter GTZ also provided in the bank application will be dealt with later.

In the exemplary embodiment described here, two codes $S1_{Purse}$ and $S2_{Purse}$ are stored in the purse area of the card for authenticating the processes between the purse application and the terminal. These codes are selected by the purse user or derived from so-called basic codes and are known only to the purse user. The purse application also contains at least two memories BSRAM and BSS. The RAM memory is for temporary storage of the sum intended for a transfer by the user. Only after all authentication processes are completed is this sum transferred to the purse memory. Finally the purse application contains a generator for generating random numbers RND.

In accordance with the purse application, purse codes $S1_{Purse}$ and $S2_{Purse}$ are also stored in the terminal. Terminal identification number TID is provided for identifying the purse terminal. Terminal transaction number TTA is incremented upon each transaction so that each transaction process is individualized. Transaction sum TB entered by the user via keyboard 7 is stored temporarily in the terminal for further processing.

The actual transfer process is composed of two commands, the "transfer" command and the "confirm" command. The run of these commands is roughly outlined in FIG. 1 with reference to signal patterns and will be described in more detail in the following with reference to FIGS. 2 and 3.

FIG. 2 shows a flow chart of the "transfer" command. The terminal first puts together data record $DAT_{Term}$ from random number RND requested from the purse application of the card, terminal identification number TID, terminal transaction number TDA and transaction sum TB. The processing of a random number dynamizes the data record in unforeseeable fashion, which is known to offer protection from so-called replay attacks. Data record $DAT_{Term}$ is now encoded with the aid of purse code $S1_{Purse}$ to generate authenticity code $MAC_{Term}$. Data record $DAT_{Term}$ and authenticity code $MAC_{Term}$ are then transmitted to the purse application in a first step of the transfer process (see also FIG. 1). The purse application now in its turn calculates safety code $MAC'_{Term}$ from the data record with the aid of purse code $S1_{Purse}$. The purse application then compares the calculated authenticity code with the authenticity code transmitted from the terminal. If this comparison is negative the transfer process is aborted here, as upon all later comparisons as well. If comparison is positive, data record $DAT_{Term}$ is transmitted to the bank application. Although this is a trans-application process it can be performed without protection since it is performed within the integrated circuit. A forger has virtually no possibilities of access on this level.

In the bank application it is now first checked whether transaction sum TB is smaller than the sum defined by disposal limit VR. If comparison is positive, transaction sum TB is deducted from disposal limit VR. It is then checked in the bank application whether the reading of global transaction counter GTZ is greater than that of purse transaction counter BTZ which, as apparent from FIG. 1, is stored in the system area of the multifunctional card (BTZ). As already mentioned, after each transfer process from the bank application to the purse application the reading of global transaction counter GTZ is transmitted to transaction counter BTZ in the purse application. A transfer is only possible if the reading of counter GTZ is greater than that of counter BTZ. This measure means that no more than one transfer can be performed with a stolen card. Only a transaction with the account-keeping bank, which requires a PIN to be entered, increases transaction counter GTZ in the bank application thereby enabling a further transfer. If more than one transfer is to be possible after a transaction with the account-keeping bank, corresponding readings of above-mentioned counters GTZ and BTZ must be taken into consideration upon a comparison.

If comparison between transaction counter GTZ and purse transaction counter BTZ shows that a transfer is possible, global transaction counter GTZ is incremented and the current reading of global transaction counter GTZ transmitted to purse transaction counter BTZ. Account number PAN and bank sort code BLZ are then added to data record $DAT_{Term}$ in the bank application. With the aid of code $S_{Bank}$ authenticity code $MAC_{Bank}$ is calculated from data record $DAT_{Bank}$. Certificate $ZF_{Bank}$ is prepared from data record $DAT_{Bank}$ and authenticity code $MAC_{Bank}$. This certificate is transmitted to the purse application in the third step of the transfer process.

In the purse application, transaction sum TB is now first transmitted to RAM memory BSRAM. Authenticity codes $MAC1_{Purse}$ and $MAC2_{Purse}$ are then calculated from certificate $ZF_{Bank}$ with the aid of codes $S1_{Purse}$ and $S2_{Purse}$.

Finally certificate $ZF_{Bank}$ is transmitted to the terminal with authenticity code $MAC1_{Purse}$ in the fourth step of the transfer process.

The terminal now in its turn calculates safety code $MAC1'_{Purse}$ from certificate $ZF_{Bank}$ with the aid of code $S1_{Purse}$ and compares authenticity codes $MAC1_{Purse}$ and $MAC1'_{Purse}$. A positive comparison means that the certificate was transmitted to the terminal from an authorized purse application. This ends the operation of the "transfer" command.

The "confirm" command is initiated, as apparent from FIG. 3, by authenticity code $MAC2'_{Purse}$ being calculated from certificate $ZF_{Bank}$ with the aid of code $S2_{Purse}$ in the terminal and transmitted to the purse application.

In the purse application, authenticity code $MAC2_{Purse}$ stored here is compared with transmitted authenticity code $MAC2'_{Purse}$. If comparison is positive the content of the RAM memory is transmitted to purse memory BSS. Due to the positive comparison the purse application ensures that the terminal has received and processed an authentic bank certificate. In a last step the RAM memory is erased and a corresponding signal about the successfully completed transfer process sent back to the terminal.

Bank certificate $ZF_{Bank}$ can be transmitted to the corresponding bank via interface 6 for example. It is also possible to store several certificates in the terminal and to transmit them to the corresponding bank at certain intervals. The measures for protecting such transmissions are known so that they need not be dealt with in any detail here. The bank is in a position to test certificate $ZF_{Bank}$ for authenticity with reference to bank code $S_{Bank}$ before remitting the corresponding sum from the card user's account to the purse supplier's account if comparison is positive with reference to the data transmitted in certificate $ZF_{Bank}$.

We claim:

1. A system for conducting transactions, said system comprising:

(a) a multi-functional card having an integrated circuit which contains a bank application associated with a bank and at least one purse application associated with a services supplier or dealer; and (b) an apparatus comprising means for loading transaction data representing at least a selectable sum of money into the purse application by transmitting the transaction data from the apparatus to the card and transferring the sum from the bank application to the purse application within the integrated circuit of the card;

said multifunctional card further comprising:

means for preparing a transaction certificate from the transaction data within the bank application using secret data known only to the bank or stored in the bank application and for transmitting the transaction certificate to the purse application;

means for authenticating the transaction certificate within the purse application to produce an authenticated transaction certificate, transmitting the authenticated transaction certificate from the purse application to the apparatus, and receiving from the apparatus a confirmation signal confirming that the apparatus has received the authenticated transaction certificate; and means for loading the sum of money into the purse application only when the apparatus confirms that the apparatus has received the authenticated transaction certificate.

2. The system of claim 1, wherein the means for authenticating authenticates the transaction certificate by second secret data that are known only to the services supplier or dealer and stored in the purse application and in the apparatus and wherein the apparatus comprises means for authenticating the confirmation signal with the second secret data.

3. The system of claim 2, wherein the means for authenticating comprises means for calculating an authenticating code for authenticating the transaction certificate in the purse application with the aid of a first purse code, the transaction certificate and the authenticating code are transmitted to the apparatus by the means for authenticating, and the apparatus further comprises means for verifying the authenticating code with the aid of the first purse code.

4. The system of claim 3, wherein the apparatus further comprises means for calculating a second authenticating code from the transaction certificate with the aid of a second purse code and transmitting the second authenticating code to the purse application, and the second authenticating code is verified in the purse application by the means for loading.

5. The system of claim 1, wherein the apparatus comprises means for generating an authenticating code that is transmitted together with the transaction data to the purse application.

6. The system of claim 1, wherein the card comprises means for checking in the bank application whether the sum of money to be transferred is within a disposal limit defined in the bank application.

7. The system of claim 1, wherein the card comprises means for ascertaining in the bank application before the transaction certificate is formed, whether a number of transfers performed with the card exceeds an adjustable value.

* * * * *